United States Patent
Horton et al.

(10) Patent No.: US 12,381,823 B2
(45) Date of Patent: Aug. 5, 2025

(54) PROVIDING COMPATIBLE NETWORK RESOURCES TO PROGRAM COMPONENTS EXECUTING IN A VIRTUALIZED ENVIRONMENT

(71) Applicant: MICROSOFT TECHNOLOGY LICENSING, LLC, Redmond, WA (US)

(72) Inventors: Keith Edgar Horton, North Bend, WA (US); Alan Thomas Gavin Jowett, Eagle MT, UT (US); Andrew Mario Beltrano, Colorado Springs, CO (US); Catalin-Emil Fetoiu, Redmond, WA (US); Guillaume Philippe Adrien Hetier, Redmond, WA (US); Matthew Yutaka Ige, Seattle, WA (US); Mitchell James Schmidt, Bellevue, WA (US); Randy Joseph Miller, Newcastle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 299 days.

(21) Appl. No.: 18/050,703

(22) Filed: Oct. 28, 2022

(65) Prior Publication Data

US 2023/0370378 A1 Nov. 16, 2023

Related U.S. Application Data

(60) Provisional application No. 63/342,593, filed on May 16, 2022.

(51) Int. Cl.
*H04L 45/76* (2022.01)
*G06F 9/455* (2018.01)
*H04L 45/02* (2022.01)

(52) U.S. Cl.
CPC .......... *H04L 45/76* (2022.05); *G06F 9/45558* (2013.01); *H04L 45/02* (2013.01); *G06F 2009/45595* (2013.01)

(58) Field of Classification Search
CPC ..... H04L 45/76; H04L 45/02; G06F 9/45558; G06F 2009/45595
See application file for complete search history.

(56) References Cited

U.S. PATENT DOCUMENTS

| 9,742,726 B2 | 8/2017 | Kolesnik et al. | |
| 2009/0204725 A1* | 8/2009 | Liu | H04W 4/18 719/321 |

(Continued)

FOREIGN PATENT DOCUMENTS

KR 20180061896 A 6/2018

OTHER PUBLICATIONS

Azam, Shehroz, "How do I enable the Internet on VirtualBox?", Retrieved from: https://linuxhint.com/enable-internet-virtualbox/, Jul. 7, 2021, 12 Pages.

(Continued)

*Primary Examiner* — Philip C Lee
(74) *Attorney, Agent, or Firm* — Newport IP, LLC; Jacob P. Rohwer (57) ABSTRACT

Technologies are disclosed for providing compatible network resources to program components executing in a virtualized environment. Virtual network adapters are created in a virtualized environment that correspond to network interfaces present on a host processing system. A virtual network interface is created in the virtualized environment and exposed to program components executing in the virtualized environment. Network packets are routed between the program components executing in the virtualized environment, the virtual network interface, the active virtual (Continued)

network adapter, and the network interface on the host processing system corresponding to the active virtual network adapter. Network control messages generated by program components executing in a virtualized environment are intercepted and forwarded to a host processing system for processing.

20 Claims, 6 Drawing Sheets

(56) References Cited

U.S. PATENT DOCUMENTS

| | | | |
|---|---|---|---|
| 2009/0222558 A1* | 9/2009 | Xu | H04L 63/1458 718/1 |
| 2021/0168114 A1* | 6/2021 | Chander | H04L 12/4641 |
| 2022/0052904 A1* | 2/2022 | Howard | H04L 47/41 |

OTHER PUBLICATIONS

Docile, Egidio, "How to use Bridged Networking with Libvirt and KVM", Retrieved from: https://linuxconfig.org/how-to-use-bridged-networking-with-libvirt-and-kvm, Mar. 12, 2021, 16 Pages.

"International Search Report and Written Opinion Issued in PCT Application No. PCT/US23/013453", Mailed Date: May 30, 2023, 13 Pages.

* cited by examiner

PROVIDING COMPATIBLE NETWORK RESOURCES TO PROGRAM COMPONENTS EXECUTING IN A VIRTUALIZED ENVIRONMENT

CROSS-REFERENCE TO RELATED APPLICATIONS

This application claims the benefit of U.S. Provisional Patent Application No. 63/342,593, entitled "Mirroring Host Network Interfaces Into a Virtualized Environment," which was filed on May 16, 2022, and which is expressly incorporated herein by reference in its entirety.

BACKGROUND

Virtualization technologies enable the creation of an abstraction layer over physical hardware that allows a single processing system, commonly referred to as a "host," to provide multiple isolated virtualized environments, commonly referred to as "guests," that execute an operating system ("OS") and other program components independently from the host. Examples of virtualized environments include virtual machines ("VMs") and containers.

In order for program components executing in a virtualized environment to execute correctly without modification, resources utilized by the program components need to be provided in the guest in the manner expected by the program components. For instance, some applications executing in a guest utilize network resources. In order to function properly without modification, these applications need to be able to access the network resources in the same manner they would if they were executing directly on the platform for which they were originally developed.

Providing network resources in the manner expected by program components executing in virtualized environments is, however, very difficult. This is particularly true when there is no one-to-one mapping between network resources provided by the host and those expected by the guest. Providing network resources in the manner expected by program components executing in virtualized environments is also difficult when the OS executing on the host exposes network resources to program components in a different manner than the OS executing in the guest.

SUMMARY

Technologies are disclosed herein for providing compatible network resources to program components executing in a virtualized environment. Through implementations of the disclosed technologies, network resources utilized by program components executing in a virtualized environment are provided in the manner expected by the program components, which enables the program components to execute properly in the virtualized environment without modification. Other technical benefits not specifically mentioned herein might also be realized through implementations of the disclosed subject matter.

In order to provide aspects of the functionality disclosed herein, virtual network adapters are created in a virtualized environment that correspond to network interfaces present on the host processing system that provides the virtualized environment. In an embodiment, the virtual network adapters are virtual Ethernet adapters. The virtual network adapters are aggregated behind a bond interface.

In an embodiment, a virtual network interface is created in the virtualized environment exposed to program components executing in the virtualized environment, such as a guest OS and applications. The virtual network interface is a type of network interface known to be compatible with the program components executing in the virtualized environment. In an embodiment, the virtual network interface is a single virtual Wi-Fi® interface. The virtual network interface is also bound to the bond interface. One of the virtual network adapters is then selected as an active virtual network adapter in the bond interface.

Once the configuration described above has been established, network packets are routed between the program components executing in the virtualized environment, the virtual network interface, the bond interface, the active virtual network adapter, and the network interface corresponding to the active virtual network adapter.

In an embodiment, network control messages generated by program components executing in the virtualized environment are intercepted and forwarded to the host processing system that provides the virtualized environment. For instance, in an embodiment a component executing in the virtualized environment intercepts a network control message generated by a program component executing in the virtualized environment. The component forwards the intercepted network control message to the host processing system which, in turn, performs a command requested by the network control message.

In an embodiment, the command is a request to scan for networks available to the host processing system. A list of the available networks is returned back to the program component executing in the virtualized environment that generated the intercepted network control message.

In an embodiment, the command specified by a network control message modifies a network setting of the host processing system. In an embodiment, the command is a command to connect the host processing system to a specified network. In another embodiment, the command is a command to disconnect the host processing system from a specified network. Other types of network control messages modify other network settings of a host processing system in other embodiments.

The above-described subject matter is implemented as a computer-controlled apparatus, a computer-implemented method, a computing device, or as an article of manufacture such as a computer readable medium in embodiments. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing compatible network resources to program components executing in a virtualized environment. As discussed briefly above, various technical benefits are realized through implementations of embodiments of the disclosed technologies, such as providing network resources to program components executing in a virtualized environment in a manner that enables the program components to execute without modification. For example, embodiments disclosed herein ensure that only supported network resources are exposed in a virtualized environment and prevent unsupported network interface types and configurations from being exposed in a virtualized environment. Thereby, program components in a virtualized environment execute and access network resources in the same manner they would if they were executing directly on the platform for which they were originally developed.

As discussed briefly above, virtualization technologies enable the creation of an abstraction layer over physical hardware that allows a single processing system, commonly referred to as a "host," to provide multiple isolated virtualized environments, commonly referred to as "guests," that execute an OS and other programs independently from the host. Examples of virtualized environments include VMs and containers.

In virtualized environments, guests commonly execute an isolated OS (the "guest OS") that is fully independent of the OS executing on the host (the "host OS"). This creates a deployment where applications and other program components deployed into the guest run in the OS environment for which they were originally designed, regardless of the host OS. This also allows program components executing in a guest to appear to a user as if they were running on the host directly. Program components are executable programs, such as applications and components of a guest OS.

In one specific example, for instance, a host executing one OS, such as the WINDOWS® OS, might be configured to provide a virtualized environment, such as a container or a VM, that executes a different OS, such as the ANDROID™ OS. In this example, applications and other program components executing in the virtualized environment have access to a runtime environment that is the same as if they were executing directly on a physical device. These program components are, therefore, able to execute in the virtualized environment without modification in embodiments. At the same time, a user of the host is able to utilize the program components as if they were running directly on the host.

In order for program components executing in a virtualized environment such as that described above to execute correctly without modification, resources utilized by the program components need to be provided in the virtualized environment in the manner expected by the program components. For instance, some program components executing in a virtualized environment utilize network resources. In order to function properly without modification, these program components need to be able to access the required network resources in the same manner they would if they were executing directly on the platform for which they were originally developed.

Provision of network resources in a virtualized environment in the manner expected by program components executing in the guest is very difficult. This is particularly true when there is no one-to-one mapping between network resources provided by the host and those expected by program components executing in the virtualized environment, and where the host OS exposes network resources to program components in a different manner than the guest OS.

For example, because the ANDROID™ OS has been primarily developed for smartphone and tablet computing devices, program components executing in a virtualized environment where the ANDROID™ OS is the guest OS might not function properly if an Ethernet interface is present or if multiple Wi-Fi interfaces are present in the virtualized environment. Other guest operating systems might have other limitations that cause program components to execute improperly when other types of network resources are present, or not present, in a virtualized environment.

Figure 1:
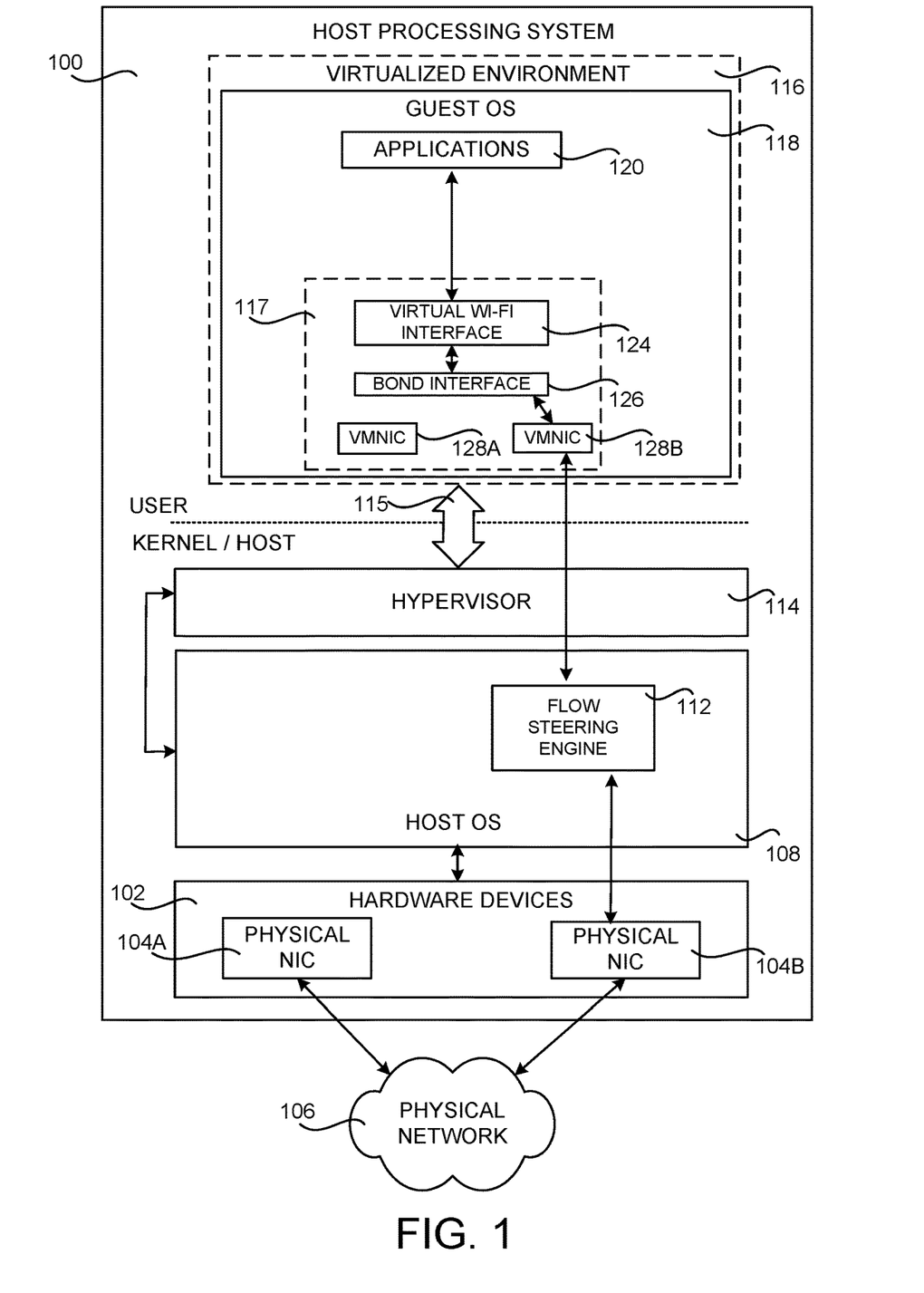
FIG. 1 is a computing system architecture diagram showing aspects of an example mechanism for exposing compatible network resources to program components executing in a virtualized environment, according to an embodiment.

FIG. 1 is a computing system architecture diagram showing aspects of an example mechanism for exposing compatible network resources to program components executing in a virtualized environment, according to an embodiment. In particular, FIG. 1 shows aspects of the configuration and operation of a host processing system 100 (referred to herein as the "host 100") configured to provide a virtualized environment 116, such as a VM or a container.

Figure 4:
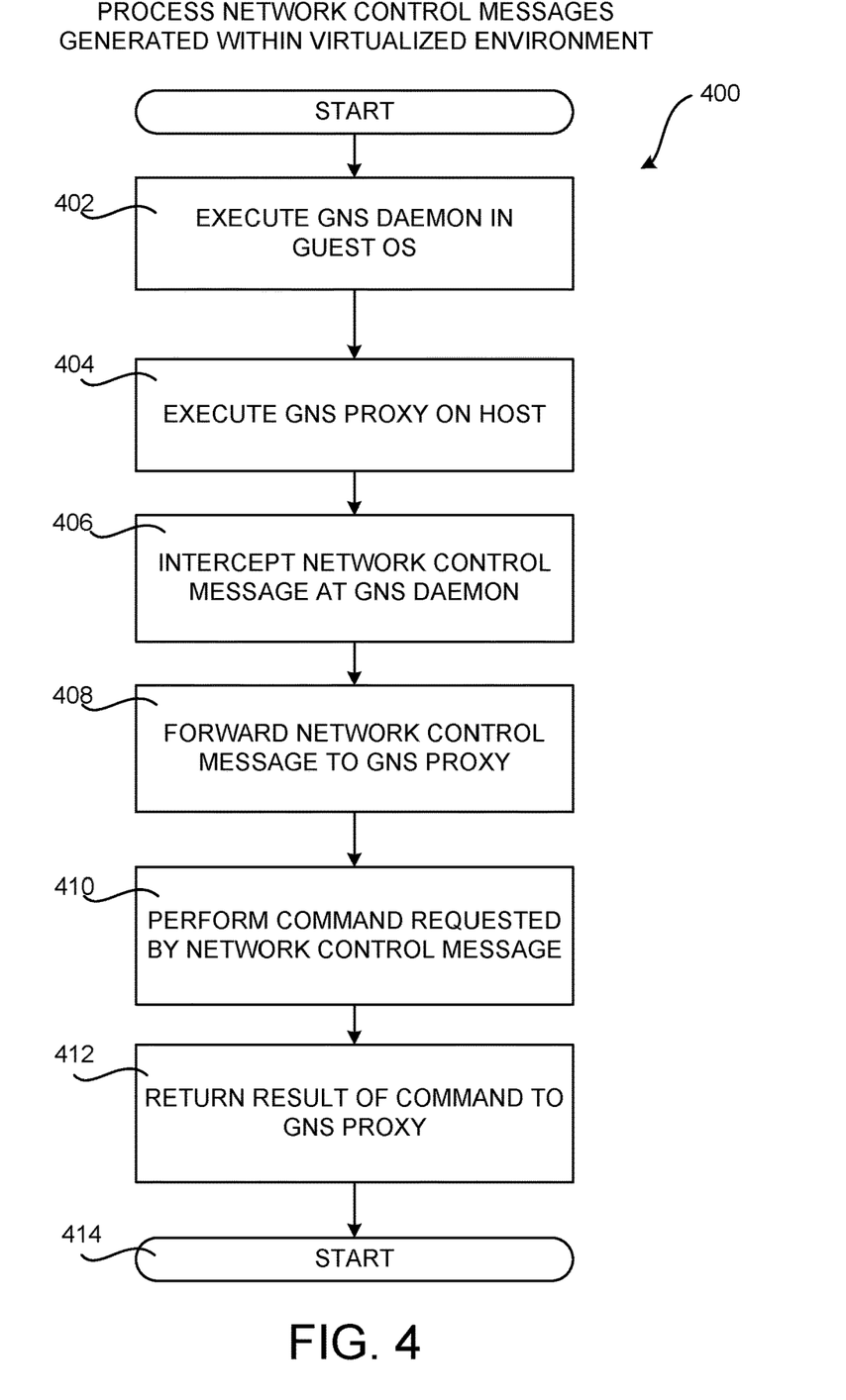
FIG. 4 is a flow diagram showing a routine that illustrates aspects of the example mechanism shown in FIG. 3 for processing network control messages generated by program components executing within a virtualized environment, according to an embodiment.

In order to provide the disclosed functionality, the host 100 includes various hardware devices 102, some of which are not illustrated in FIG. 1 for simplicity, including several physical network interface cards (referred to herein as "network interfaces") 104A and 104B. The network interfaces 104A and 104B are hardware devices that provide media access to a physical network 106, such as a wired or wireless local area network, the internet, a cellular network, or a virtual private network ("VPN"). Although two network interfaces 104A and 104B are illustrated in FIG. 1, the host 100 might include other numbers of network interfaces in other examples. FIG. 4, described below, provides additional detail regarding some of the other hardware components that might be present in the host 100.

A host network stack (not shown in FIG. 1) handles network communications passing between the host 100 and the physical network 106 via the network interfaces 104A and 104B. The host network stack typically includes appropriate layers of the Open Systems Interconnection ("OSI") model.

As also shown in FIG. 1 and described briefly above, the host 100 executes a host OS 108. In an embodiment, the host OS 108 is a member of the WINDOWS® family of operating systems from MICROSOFT® CORPORATION.

Other operating systems from other developers might be utilized as the host OS 108 in other embodiments.

The host 100 also executes a hypervisor 114 in some embodiments. The hypervisor 114 is a software component that virtualizes hardware access for virtualized environments 116, such as VMs and containers. The term "hypervisor," as used herein, is considered to include privileged host-side virtualization functionality commonly found in privileged partitions or hardware isolated virtualized environments.

Virtual machine managers ("VMMs"), container engines, and kernel-based virtualization modules are some examples of hypervisors. The technologies disclosed herein are utilized with other types of solutions for providing isolated access to virtualized hardware to virtualized environments 116 in other embodiments.

In the embodiment illustrated in FIG. 1, the hypervisor 114 provides support for one or more virtualized environments 116. In an embodiment, the virtualized environment 116 is a container. However, the virtualized environment 116 might be a VM or another type of hardware isolated virtualized environment in other embodiments. A guest-host communication channel 115, such as a socket-based interface, is established between the host 100 and the virtualized environment 116 to enable network communication between the guest OS 118 and the host OS 108 in some embodiments.

As shown in FIG. 1, and described briefly above, a guest OS 118 is executed in the virtualized environment 116 in an embodiment. In an embodiment, the guest OS 118 is a different OS than the host OS 108. The guest OS 118 includes a complete OS kernel executing fully independently of the kernel of the host OS 108 in some embodiments.

Through virtualization, the guest OS 118 and other program components executing on the guest OS 118, such as the applications 120, execute in the virtualized environment 116 in the same manner they would if they were executing directly on the host 100 (e.g., executing directly on the host OS 108). The guest OS 118 and other program components executing on the guest OS 118, such as the applications 120, are generally unaware that they are not executing directly on physical hardware.

In an embodiment, the guest OS 118 is the ANDROID™ OS developed by the OPEN HANDSET ALLIANCE™ and commercially sponsored by GOOGLE® LLC. The ANDROID™ OS is a mobile OS based on a modified version of the LINUX® kernel and other open source software and has been designed primarily for touchscreen mobile devices such as smartphones and tablet computing devices.

In another embodiment, the guest OS 118 is the TIZEN™ OS backed by the LINUX FOUNDATION™ and mainly developed and utilized by SAMSUNG® ELECTRONICS CO., LTD. Other operating systems from other developers might be utilized as the guest OS 118 in other embodiments.

As discussed briefly above, various challenges arise when attempting to provide network resources to a guest OS 118 and other program components executing in a virtualized environment 116. This is particularly true when there is not a one-to-one mapping between network resources provided by the host 100 and those expected by the program components executing in the virtualized environment 116, and where host OS 108 exposes network resources in a different manner than the guest OS 118. For example, when the guest OS 118 is the ANDROID™ OS, program components such as the applications 120 might not function properly if an Ethernet interface is present or if multiple Wi-Fi interfaces are present in the virtualized environment 116. In order to address this technical challenge, and potentially others, an abstraction layer 117 is provided in the virtualized environment 116 that ensures that the guest OS 118 and other program components executing thereupon, such as the applications 120, do not encounter an unsupported network configuration.

In an embodiment, network interfaces 104A and 104B available to the host 100 are projected into the virtualized environment 116 by creating corresponding virtual network adapters 128A and 128B in the virtualized environment 116. The virtual network adapters 128A and 128B are virtual Ethernet adapters in the embodiment shown in FIG. 1 but might be implemented as other types of network adapters in other embodiments.

Certain applications might not function properly when a particular type of network adapter is present. For instance, when the guest operating system is the ANDROID™ OS, some applications might not function properly if an Ethernet adapter is present. In order to prevent this from occurring, the virtual network adapters 128A and 128B are not exposed to the guest OS 118 in the illustrated embodiment.

In the embodiment shown in FIG. 1, the virtual network adapters 128A and 128B are aggregated behind a single bond interface 126. The bond interface 126 is a software component that provides functionality for combining multiple virtual network adapters 128A and 128B into a single interface for redundancy or increased throughput.

The bond interface 126 also provides functionality for selecting a single virtual network adapter 128A or 128B as the active adapter. In the example shown in FIG. 1, for instance, the virtual network adapter 128B, which corresponds to the network interface 104B, has been set as the active interface. The virtual network adapters 128A and 128B in the virtualized environment 116 need not be of the same type as the network interfaces 104A and 104B to which they correspond. For instance, in the illustrated example, the network interface 104B might be a Wi-Fi® adapter while the virtual network adapter 128B in the virtualized environment 116 might be an Ethernet adapter.

In order to expose a compatible network interface to the guest OS 118, a virtual Wi-Fi® interface 124 is created in an embodiment and bound to the bond interface 126. The virtual Wi-Fi® interface 124 is the only network interface visible to the guest OS 118 and other program components executing in the virtualized environment 116 in this embodiment. Additionally, and as will be described in greater detail below, the bond interface 126 sets only a single one of the virtual network adapters 128A and 128B as the active interface at any given time. As mentioned above, the virtual network adapter 128B, which corresponds to the network interface 104B, has been set as the active interface in the example shown in FIG. 1.

The virtual interface, or interfaces, exposed to the guest OS 118 and other program components executing in the virtualized environment 116 are interface types and configurations that are compatible with the guest OS 118 and other program components, such as the applications 120. For instance, if the guest OS 118 is the ANDROID™ OS, at most four virtual interfaces 124 (with their corresponding network stacks) will be exposed: a loopback interface (not shown in FIG. 1); a single Wi-Fi® adapter (e.g., the virtual Wi-Fi interface 124 shown in FIG. 1); a single cellular adapter; and a virtual private network ("VPN") interface (also not shown in FIG. 1). This ensures that program components executing in the virtualized environment 116 will not encounter unsupported interface types or network configurations.

The virtual Wi-Fi® interface 124 and bond interface 126 forward network packets out to the virtual network adapter 128A or 128B currently set as active in the bond interface 126. In the example shown in FIG. 1, for instance, the virtual Wi-Fi® interface 124 forwards network packets received from applications 120 and the guest OS 118 to the virtual network adapter 128B.

In turn, the network packets are forwarded to a flow steering engine ("FSE") 112, described below, and routed to a network interface 104 on the host 100, such as the network interface 104B in the illustrated embodiment, for transmission on the physical network 106. Similarly, network packets received at a network interface 104 and destined for the virtualized environment 116 are be routed to the FSE 112, the virtual network adapter 128B, the bond interface 126, the virtual Wi-Fi® interface 124, and, finally, to the destination program component in the virtualized environment 116 in an embodiment.

In embodiments where the guest OS 118 is the ANDROID™ OS, exposing only a single virtual interface, such as the Wi-Fi® interface 124, to the program components executing in the virtualized environment 116 ensures that the program components will not encounter an unsupported interface or interface configuration. For instance, when the guest OS 118 is the ANDROID™ OS, program components executing in the virtualized environment 116 will not encounter an Ethernet interface or multiple Wi-Fi® interfaces, which might cause the program components to malfunction.

Although a virtual Wi-Fi® interface 124 is shown in the embodiment illustrated in FIG. 1, the virtual interface exposed to the guest OS 118 and applications 120 might be configured as another type of wired or wireless interface in other embodiments. For example, if a guest OS 118 does not provide support for Wi-Fi® interfaces, a virtual Ethernet interface could be exposed to the virtualized environment 116 rather than the virtual Wi-Fi® interface 124 described above. A virtual cellular interface might also be exposed to the virtualized environment 116 rather than the virtual Wi-Fi® interface 124 in a similar fashion.

As discussed briefly above, once the network interfaces 104A and 104B have been mirrored into the virtualized environment 116 and the abstraction layer 117 has been created in the virtualized environment 116 in the manner described above, the host 100 is configured to properly route network traffic between a network interface 104 on the host 100 and a virtual network adapter, such as the virtual Wi-Fi® interface 124, in the virtualized environment 116 in an embodiment. In order to provide this functionality, each independent OS (e.g., the host OS 108 and the guest OS 118) assigns the same unique identity (e.g., the same internet protocol ("IP") address and the same media access control ("MAC") address) to their corresponding network adapters in an embodiment.

Additionally, and as mentioned briefly above, the FSE 112 is executed on the host 100. The FSE 112 is a software component configured to route network packets to and from the virtualized environment 116 through a virtual switch (not shown in FIG. 1) connected to the virtualized environment 116. The FSE 112 is an OS driver in an embodiment, but might be implemented as another type of component in other embodiments. For instance, in embodiments the FSE 112 is implemented as part of a Transmission Control Protocol ("TCP") or User Datagram Protocol ("UDP") module or as a shim or filter between the transport layer and another layer of the host network stack.

In an embodiment, the FSE 112 routes packets to and from the virtualized environment 116 by determining which packets are destined for the host OS 108 and which are destined for the virtualized environment 116 by tracking unique OSI Layer 4 identifiers, such as TCP and UDP port numbers. In this manner, the guest OS 118 executes without modification to its network stack, and the host OS 108 largely has an unmodified network stack (e.g., only the FSE 112 is added to the network stack of the host OS 108) in embodiments.

Following the operations described above, the guest OS 118 will have a virtual network adapter 128 that is active in the bond interface 126 (e.g., the virtual network adapter 128 that is mirroring the active network interface 104 on the host 100). Additionally, the guest OS 118 will have a single virtual interface (e.g., the virtual Wi-Fi® interface 124) visible to applications 120 and the guest OS 118 in an embodiment.

In an embodiment, the host 100 utilizes various heuristics to select a single network interface 104 that is connected to the virtualized environment 116 in the manner described above. In embodiments, these heuristics include the current network configuration of the host 100, whether available network interfaces 104 are physical or virtual, the type of the preferred network interface 104 on the host 100, the network properties of network interfaces 104 on the host 100, and the types of virtual network interfaces that are exposed in the virtualized environment 116 without causing program components executing therein to crash or otherwise malfunction.

In an embodiment, program components executing in the virtualized environment 116 issue network control messages requesting that the host 100 establish a connection to a specified network 106, network control messages requesting that the host 100 disconnect from a specified network 106, and network control messages for requesting a list of available networks 106 from the host 100. In this way, program components executing in the virtualized environment modify network settings of the host 100 in an embodiment.

Details regarding one mechanism disclosed herein for handling network control messages generated by program components executing in the virtualized environment 116 will be described below with regard to FIGS. 3 and 4. Additional details regarding the mechanism described above for enabling network packets to flow to and from the virtualized environment 116 in a manner that is compatible with program components executing in the virtualized environment 116 will be provided below with regard to FIG. 2.

Figure 2:
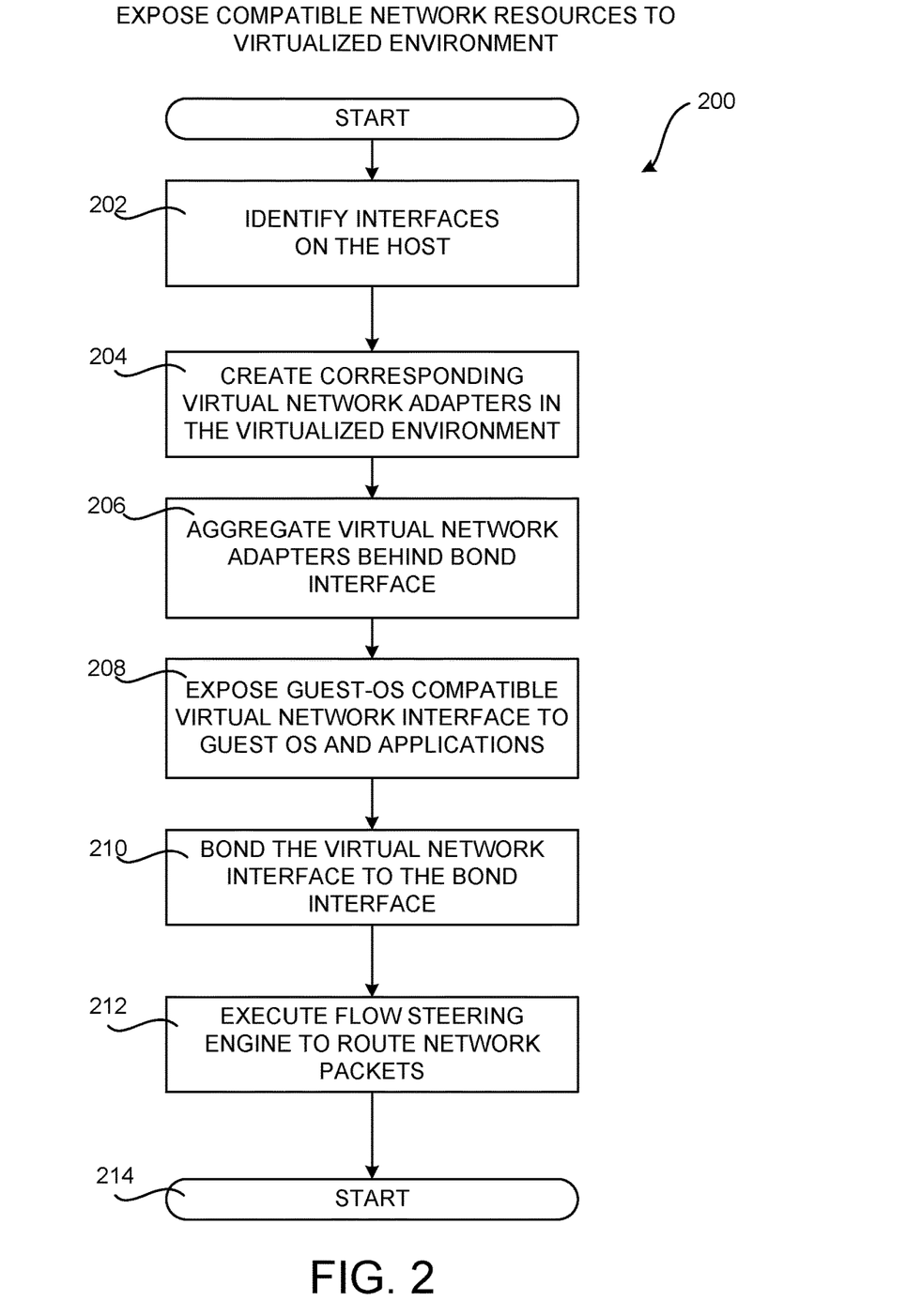
FIG. 2 is a flow diagram showing a routine that illustrates aspects of the example mechanism shown in FIG. 1 for exposing compatible network resources to program components executing in a virtualized environment, according to an embodiment.

FIG. 2 is a flow diagram showing a routine 200 that illustrates aspects of the mechanism shown in FIG. 1 for exposing compatible network resources to program components executing in a virtualized environment 116, according to an embodiment. The routine 200 begins at operation 202, where the network interfaces 104 present on the host 100 are identified. In an embodiment, a service executing on the host 100 identifies the network interfaces 104. Other components are configured to identify the network interfaces 104 in other embodiments.

From operation 202, the routine 200 proceeds to operation 204, where virtual network adapters 128 are created in the virtualized environment 116 that correspond to the network interfaces 104 identified at operation 202. Once the virtual network adapters 128 have been created, the routine 200 proceeds from operation 204 to operation 206, where the virtual network adapters 128 are aggregated behind the bond interface 126 in the manner described above with regard to FIG. 1. As discussed briefly above, and in greater detail below, one of the virtual network adapters 128 is selected as the active interface in the bond interface 126 in an embodiment.

From operation 206, the routine 200 proceeds to operation 208, where a virtual network interface that is compatible with the program components executing in the virtualized environment 116, such as the virtual Wi-Fi® interface 124 in the embodiment shown in FIG. 1, is exposed to the program components executing in the virtualized environment 116. The routine 200 then proceeds from operation 208 to operation 210, where the newly created virtual network interface is bound to the bond interface 126. In the embodiment shown in FIG. 1, for instance, the virtual Wi-Fi® interface 124 has been bound to the bond interface 126.

From operation 210, the routine 200 proceeds to operation 212, where the FSE 112 is executed. As discussed above, the FSE 112 forwards network packets to and from the virtualized environment 116 through a virtual switch connected to the virtualized environment 116. From operation 212, the routine 200 proceeds to operation 214, where it ends.

Figure 3:
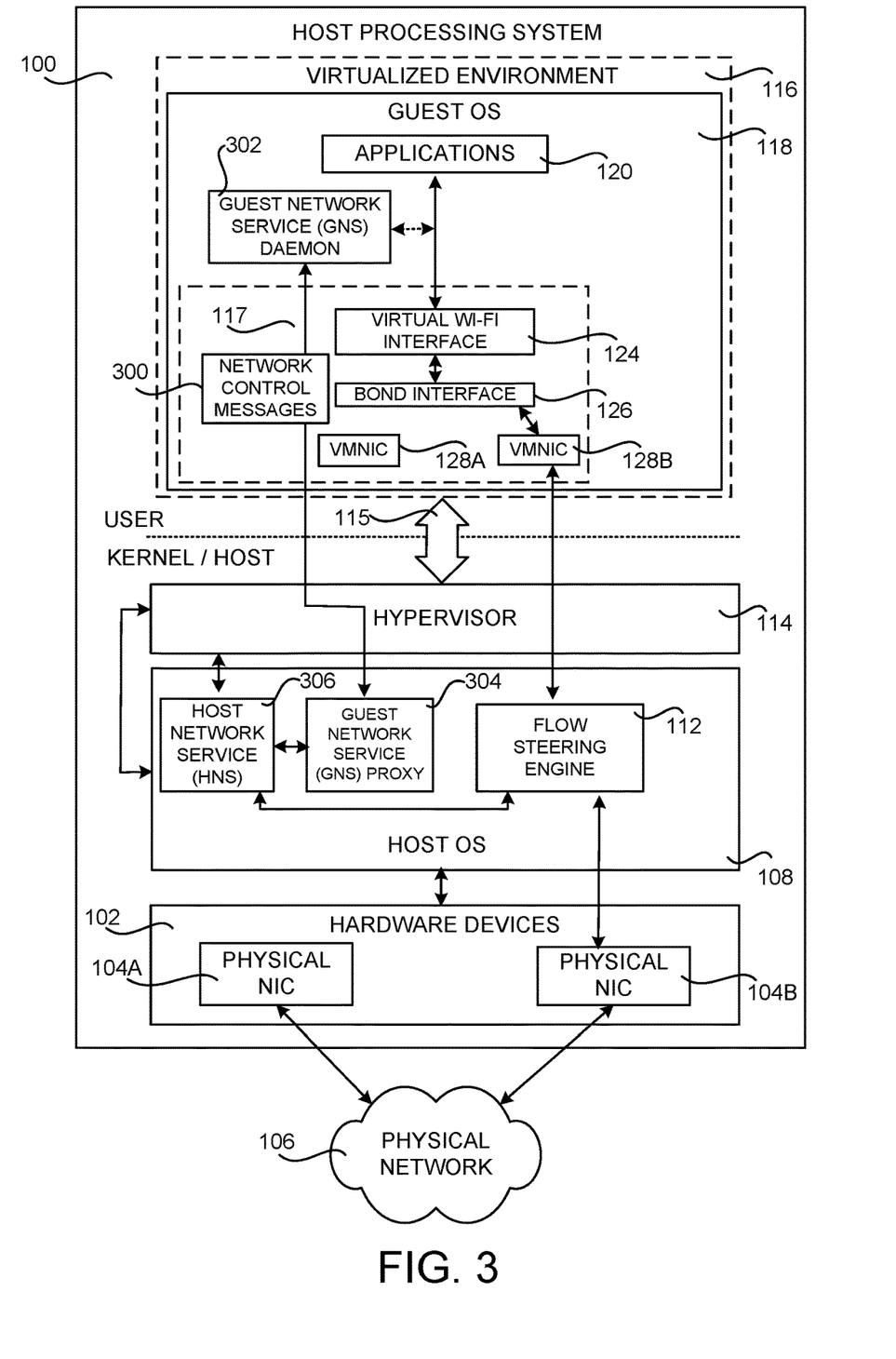
FIG. 3 is a computing system architecture diagram showing aspects of an example mechanism disclosed herein for processing network control messages generated by program components executing within a virtualized environment, according to an embodiment.

FIG. 3 is a computing system architecture diagram showing aspects of a mechanism for handling network control messages 300 generated within a virtualized environment 116, according to an embodiment. As discussed briefly above, network control messages 300 are messages requesting to modify a network setting of the host 100 or to obtain information about a network, or networks, from the host 100. Examples of network control messages 300 include messages requesting that a host 100 establish a connection to a specified network 106, messages requesting that the host 100 disconnect from a specified network 106, and messages requesting a list of networks 106 available to the host 100.

Program components executing within the virtualized environment 116, such as the guest OS 118 and the applications 120, generate network control messages 300 in an embodiment. The virtual network interface exposed to the guest OS 118 (e.g., the virtual Wi-Fi® interface 124 in the embodiment shown in FIG. 1) handles network control messages 300 from application programming interfaces ("APIs") called by the program components executing in the virtualized environment 116 in an embodiment.

In order to handle network control messages 300 generated by program components executing in the virtualized environment 116, a guest network service ("GNS") daemon 302 is executed in the guest OS 118, in an embodiment. The GNS daemon 302 is a software component (e.g., a daemon) that intercepts network control messages 300 from program components executing in the virtualized environment 116 and forwards the messages 300 to a GNS proxy 304 executing on the host 100.

For instance, and as will be described in greater detail below, the GNS daemon 302 might intercept network control messages 300 generated by an application 120 requesting that the host 100 connect to a specific network 106, requesting that the host 100 disconnect from a network 106, or for performing a scan to identify the networks 106 that are available to the host 100. The GNS daemon 302 intercepts other types of network control messages 300 for performing other types of functions in other embodiments.

As discussed briefly above, the GNS daemon 302 forwards intercepted network control messages 300 to the GNS proxy 304 executing on the host 100. The GNS proxy 304 is a software component that is configured to receive forwarded network control messages 300 from the GNS daemon 302 and to implement aspects of operations requested by the network control messages 300. For example, the GNS proxy 304 might cause the host 100 to connect to a network 106, disconnect from a network 106, or perform a scan of available networks 106 in response to receiving network control messages 300 from the GNS daemon 302.

The GNS proxy 304 also provides a response to a network control message 300 back to the GNS daemon 302 in an embodiment. Such a response might indicate, for example, whether an attempt to connect to or disconnect from a network 106 was successful or the results of a network scan. The GNS proxy 304 provides other types of responses to other types of network control messages 300 in other embodiments. Additional details regarding the mechanism described above for intercepting and processing network control messages 300 will be provided below.

Network Scan

As described briefly above, functionality is provided in some embodiments that enables program components executing in the virtualized environment 116, such as the guest OS 118 and the applications 120, to request a list of available wireless networks 106 from the underlying network interface 104. In an embodiment, the list contains an enumeration of observable Service Set Identifiers ("SSIDs") from wireless network interface 104 on the host 100. In order to provide this functionality, the GNS daemon 302 intercepts a network control message 300 requesting a scan to identify available wireless networks 106 from a program component executing in the virtualized environment 116 in the manner described above.

In response to intercepting a network control message 300 requesting a scan to identify available wireless networks 106, the GNS daemon 302 requests a Wi-Fi® scan list from the host network service 306. In turn, the host 100 scans over each network interface 104 that is a wireless interface and that is turned on. The scan results from each network interface 104 are organized into a single array of strings so that all names are unique. The list is then returned to GNS daemon 302 which, in turn, completes the intercepted network control message 300, thereby sending the list of available wireless networks to the requesting program component in the virtualized environment 116.

Network Connection

As also discussed above, program components, such as the applications 120, executing in the virtualized environment 116 also generate network control messages 300 requesting to connect to a specific network (e.g., a specific SSID) in an embodiment. In an embodiment, the GNS daemon 302 intercepts network control messages 300 from program components in the virtualized environment 116, such as the guest OS 118 or applications 120, to connect to a specific network 106. The GNS daemon 302 forwards the intercepted network control messages 300 to the GNS proxy 304 in the manner described above.

The GNS proxy 304, in turn, instructs the HNS 306 to connect to the network 106 identified by the intercepted network control message 300. The HNS 306 causes the host 100 to connect to the specified network 106, if not already connected. As discussed above, the HNS 306 is a component of the host OS 108 that manages network connections in an embodiment.

The GNS proxy 304 then instructs the GNS daemon 302 to configure the bond interface 126 to the virtual network adapter 128 corresponding to the network interface 104 that is connected to the requested network. The GNS daemon 302, in turn, marks the active virtual network adapter 128 associated with the network interface 104 connected to the selected network 106 as the active interface in the bond interface 126.

Network properties present in the host OS 108 for the newly selected network 106 are then synchronized to the virtualized environment 116. In an embodiment, the network properties that are synchronized into the virtualized environment 116 are selected from all of the network properties available to the host 100 based upon whether those network properties would have been used by a program component executing in the virtualized environment 116 if it were executed directly on the host 100. For instance, only those properties that would have been used by an application 120 if executed directly on the host 100 are synchronized into the virtualized environment 116 in some embodiments.

If a connection to a Wi-Fi® network is requested, the network properties synchronized from the host 100 to the virtual Wi-Fi® interface 124 will reflect the network properties utilized by the network interface 104 connected to the requested wireless network 106. For example, a network address, domain name server ("DNS") address, routes, and other network properties of the network interface 104 connected to the requested wireless network 106 are synchronized to the GNS daemon 302 and utilized to configure the virtual Wi-Fi® interface 124 in an embodiment. If a connection to an Ethernet or cellular network 106 is requested, the network properties returned to the GNS daemon 302 and utilized to configure the virtual Wi-Fi® interface 124 (including SSID) are hardcoded values that represent a wireless network.

In some embodiments, the network properties that are pushed into the virtualized environment 116 are identified based upon the type of program component requesting to connect to a network 106. For instance, when a component of the host OS 108 or an application 120 requests a connection to a network 106 in the manner described above, all available network properties are pushed into the virtualized environment 116, not just network addresses and routes, but higher-level concepts such as DNS name resolution prioritization rules and hypertext transfer protocol ("HTTP") proxy configurations.

Network Disconnection

As discussed above, the GNS daemon 302 also intercepts network control messages 300 requesting to disconnect from a network 106 in an embodiment. The GNS daemon 302 forwards these network control messages 300 to the GNS proxy 304. The GNS proxy 304, in turn, instructs the HNS 306 to disconnect from the specified network 106. In an embodiment, a result message is returned by the GNS proxy 304 to the GNS daemon 302 indicating whether the disconnection request was successful.

While the embodiments disclosed herein have been primarily presented in the context of network control messages 300 for performing a network scan, connecting to a network 106, and disconnecting from a network 106, other types of network control messages 300 are processed in a similar manner in embodiments. Additionally, the embodiments disclosed herein enable program components executing in a virtualized environment 116 to modify network settings of a host 100 such as by causing the host 100 to connect to a specified network 106 or disconnect from a specified network 106. Program components executing in a virtualized environment 116 modify other network settings of a host 100 in other embodiments.

FIG. 4 is a flow diagram showing a routine 400 that illustrates aspects of the example mechanism shown in FIG. 3 for processing network control messages 300 generated by program components executing within a virtualized environment 116, according to an embodiment. The routine 400 begins at operation 402, where the GNS daemon 302 is executed in the virtualized environment 116. As discussed above, the GNS daemon 302 is a software component (e.g., a daemon) that intercepts network control messages 300 from program components executing in the virtualized environment 116 and forwards the messages 300 to a GNS proxy 304 executing on the host 100.

From operation 402, the routine 400 proceeds to operation 404, where the GNS proxy 304 is executed on the host 100. As also discussed above, the GNS proxy 304 is a software component that is configured to receive forwarded network control messages 300 from the GNS daemon 302 and to implement aspects of operations requested by the network control messages 300.

From operation 404, the routine 400 proceeds to operation 406, where the GNS daemon 302 intercepts network control messages 300. The routine 400 then proceeds from operation 406 to operation 408, where the GNS daemon 302 forwards intercepted network control messages 300 to the GNS proxy 304 in the manner described above.

From operation 408, the routine 400 proceeds to operation 410, where the GNS proxy 304 implements the commands requested by the intercepted network control messages 300. For example, the GNS proxy 304 might cause the host 100 to perform a scan of available networks 106, connect to a specified network 106, disconnect from a specified network 106, or perform another type of command. Details regarding the various operations utilized to perform these commands in an embodiment were provided above.

From operation 410, the routine 400 proceeds to operation 412, where the GNS proxy 304 returns the results of performing a requested command to the GNS daemon 302. The GNS daemon 302, in turn, provides a response to the program component that generated the original network control message 300. For example, in an embodiment the GNS daemon 302 provides an indication as to whether the requested command was successful. In another embodiment, the GNS daemon 302 provides the results of wireless network scan to an application 120. The routine 400 then proceeds from operation 412 to operation 414, where it ends.

The technologies disclosed herein ensure that compatibility requirements relating to available network interfaces and configurations for program components executing in a virtualized environment 116 are satisfied. For example, when the guest OS 118 is the ANDROID™ OS, the embodiments illustrated in FIGS. 1-4 and described above: enable applications 120 and other program components to run without modification; ensure that unsupported interface types or configurations are exposed to program components executing in a virtualized environment 116; and enable a user to interact with the program components as if they were running natively on the host 100. Alternate or additional compatibility requirements might also be satisfied by the technologies disclosed herein to support proper execution of program components on other types of guest operating systems, such as the TIZEN™ OS.

Figure 5:
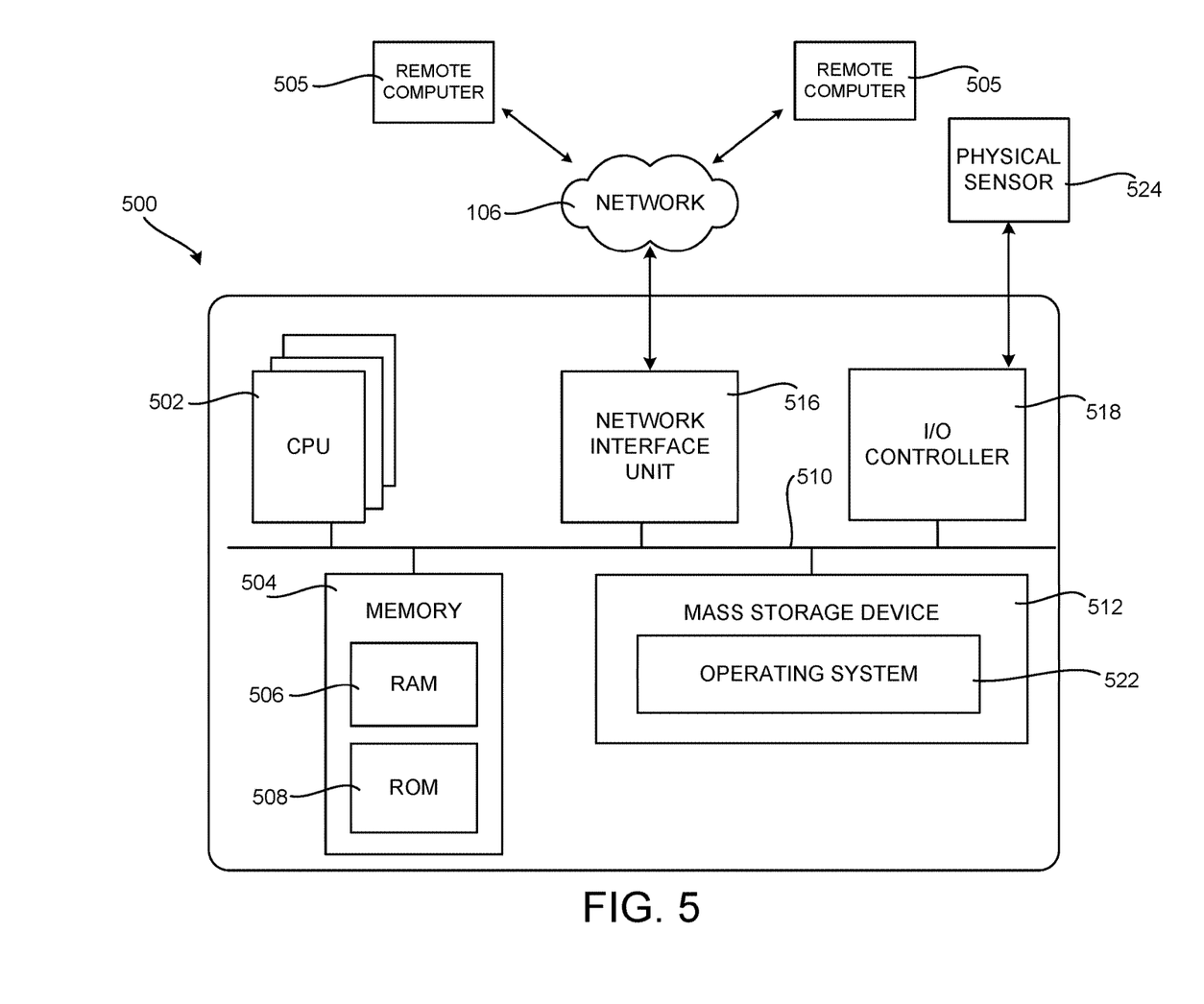
FIG. 5 is a computer architecture diagram showing an illustrative computer hardware and software architecture for a computing device that implements aspects of the technologies presented herein in an embodiment.

FIG. 5 is a computer architecture diagram showing an illustrative computer hardware and software architecture for a processing system 500 that implements the various technologies presented herein in embodiments. In particular, the architecture illustrated in FIG. 5 is utilized to implement a host 100 capable of providing aspects of the functionality disclosed herein in an embodiment.

The processing system 500 illustrated in FIG. 5 includes a central processing unit 502 ("CPU"), a system memory 504, including a random-access memory 506 ("RAM") and a read-only memory ("ROM") 508, and a system bus 510 that couples the system memory 504 to the CPU 502. A firmware (not shown in FIG. 5) containing the basic routines that help to transfer information between elements within the processing system 500, such as during startup, is stored in the ROM 508 in an embodiment.

The processing system 500 further includes a mass storage device 512 for storing an operating system 522, such as the host OS 108, application programs, and other types of programs, some of which have been described herein. The mass storage device 512 is configured to store other types of programs and data in embodiments.

The mass storage device 512 is connected to the CPU 502 through a mass storage controller (not shown in FIG. 5) connected to the bus 510. The mass storage device 512 and its associated computer readable media provide non-volatile storage for the processing system 500. Although the description of computer readable media contained herein refers to a mass storage device, such as a hard disk, Compact Disk Read-Only Memory ("CD-ROM") drive, Digital Versatile Disc-Read Only Memory ("DVD-ROM") drive, or Universal Serial Bus ("USB") storage key, computer readable media encompasses any available computer-readable storage media or communication media that is accessible by the processing system 500.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, communication media includes wired media such as a wired network or direct-wired connection, and wireless media such as acoustic, radio frequency, infrared and other wireless media. Combinations of the any of the above are also included within the scope of computer-readable media.

By way of example, computer-readable storage media includes volatile and non-volatile, removable and non-removable media implemented in any method or technology for storage of information such as computer readable instructions, data structures, program modules or other data. For example, computer-readable storage media includes RAM, ROM, erasable programmable ROM ("EPROM"), electrically EPROM ("EEPROM"), flash memory or other solid-state memory technology, CD-ROM, DVD-ROM, HD-DVD, BLU-RAY®, or other optical storage, magnetic cassettes, magnetic tape, magnetic disk storage or other magnetic storage devices, or any other medium that configured to store the desired information and which is accessible by the processing system 500. For purposes of the claims, the phrase "computer-readable storage medium," and variations thereof, does not include waves or signals per se or communication media.

According to various configurations, the processing system 500 operates in a networked environment using logical connections to remote computers 505 through a network such as the network 106. The processing system 500 connects to the network 106 through a network interface unit 516 connected to the bus 510 in an embodiment. The network interface unit 516 connects to other types of networks and remote computer systems in other embodiments.

The processing system 500 also includes an input/output controller 518 for receiving and processing input from a number of other devices, including a keyboard, mouse, touch input, an electronic stylus (none of which are shown in FIG. 5), or a physical sensor 524, such as a video camera, in embodiments. Similarly, the input/output controller 518 provides output to a display screen or other type of output device (also not shown in FIG. 5) in embodiments.

The software components described herein, when loaded into the CPU 502 and executed, transform the CPU 502 and the overall processing system 500 from a general-purpose computing device into a special-purpose processing system customized to facilitate the functionality presented herein. In embodiments, the CPU 502 is constructed from transistors or other discrete circuit elements, which individually or collectively assume any number of states in embodiments. More specifically, the CPU 502 operates as a finite-state machine, in response to executable instructions contained within the software modules disclosed herein, in embodiments. These computer-executable instructions transform the CPU 502 by specifying how the CPU 502 transitions between states, thereby transforming the transistors or other discrete hardware elements constituting the CPU 502.

Encoding the software modules presented herein might also transform the physical structure of the computer readable media presented herein. The specific transformation of physical structure depends on various factors, in different implementations of this description. Examples of such factors include, the technology used to implement the computer readable media, whether the computer readable media is characterized as primary or secondary storage, and the like.

For example, if the computer readable media is implemented as semiconductor-based memory, the software disclosed herein is encoded on the computer readable media by transforming the physical state of the semiconductor memory. For instance, the software transform the state of transistors, capacitors, or other discrete circuit elements constituting the semiconductor memory in an embodiment. The software transforms the physical state of such components in order to store data thereupon in embodiments.

In embodiments, the computer readable media disclosed herein is implemented using magnetic or optical technology. In such embodiments, the program components presented herein transform the physical state of magnetic or optical media, when the software is encoded therein. These transformations include altering the magnetic characteristics of particular locations within given magnetic media. These transformations also include altering the physical features or characteristics of particular locations within given optical media, to change the optical characteristics of those locations, in embodiments. Other transformations of physical media are possible without departing from the scope and spirit of the present description, with the foregoing examples provided only to facilitate this discussion.

Many types of physical transformations take place in the processing system 500 in order to store and execute the software components presented herein. The architecture shown in FIG. 5 for the processing system 500, or a similar architecture, is utilized to implement other types of computing devices, including hand-held computers, video game devices, embedded computer systems, mobile devices such as smartphones, tablets, alternate reality ("AR"), mixed reality ("MR"), and virtual reality ("VR") devices, and other types of computing devices known to those skilled in the art. It is also contemplated that the processing system 500 might not include all of the components shown in FIG. 5, might include other components that are not explicitly shown in FIG. 5, or might utilize an architecture completely different than that shown in FIG. 5.

Figure 6:
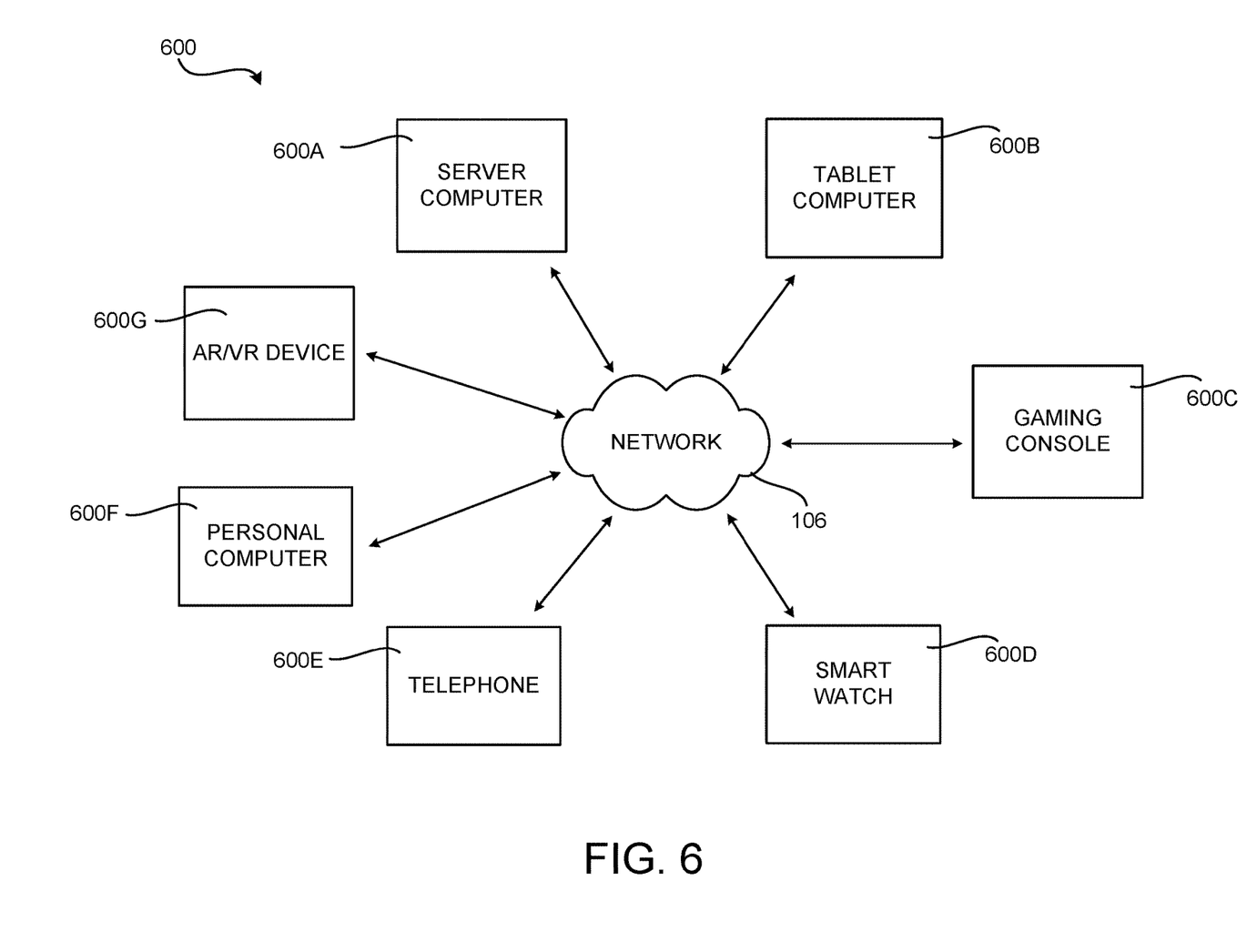
FIG. 6 is a network diagram illustrating an example distributed computing environment in which aspects of the disclosed technologies are implemented in an embodiment.

FIG. 6 is a network diagram illustrating a distributed network computing environment 600 in which aspects of the disclosed technologies are implemented, according to various embodiments presented herein. As shown in FIG. 6, one or more server computers 600A are interconnected in embodiments via a network 106 (e.g., either of, or a combination of, a fixed-wire or WLAN, wide-area network ("WAN"), intranet, extranet, peer-to-peer network, VPN, the internet, Bluetooth® communications network, proprietary low voltage communications network, or other communications network) with a number of client computing devices such as a tablet computer 600B, a gaming console 600C, a smart watch 600D, a telephone 600E, such as a smartphone, a personal computer 600F, and an AR/VR device 600G.

In a network environment in which the network 106 is the internet, for example, the server computer 600A is a dedicated server computer operable to process and communicate data to and from the client computing devices 600B-600G via any of a number of known protocols, such as, hypertext transfer protocol ("HTTP"), file transfer protocol ("FTP"), or simple object access protocol ("SOAP") in an embodiment.

Additionally, in embodiments the network computing environment 600 utilizes various data security protocols such as secured socket layer ("SSL") or pretty good privacy ("PGP"). In an embodiment, each of the client computing devices 600B-600G is equipped with an OS, such as the host OS 108, operable to support one or more computing applications or terminal sessions such as a web browser (not shown in FIG. 6), graphical UI (not shown in FIG. 6), or a mobile desktop environment (not shown in FIG. 6) to gain access to the server computer 600A.

The server computer 600A is communicatively coupled to other computing environments (not shown in FIG. 6) and receives data regarding a participating user's interactions in embodiments. In an illustrative operation, a user (not shown in FIG. 6) interacts with a computing application running on a client computing device 600B-600G to obtain desired data and/or perform other computing applications.

The data and/or computing applications are stored on the server 600A, or servers 600A, and communicated to cooperating users through the client computing devices 600B-600G over the network 106 in an embodiment. In an embodiment a participating user (not shown in FIG. 6) requests access to specific data and applications housed in whole or in part on the server computer 600A. These data are communicated between the client computing devices 600B-600G and the server computer 600A for processing and storage in an embodiment.

The server computer 600A hosts computing applications, processes and applets for the generation, authentication, encryption, and communication of data and applications such as those described above with regard to FIGS. 1-4, and cooperates with other server computing environments (not shown in FIG. 6), third party service providers (not shown in FIG. 6), and network attached storage ("NAS") and storage area networks ("SAN") (not shown in FIG. 6) to realize application/data transactions in embodiments.

The computing architecture shown in FIG. 5 and the distributed network computing environment shown in FIG. 6 have been simplified for ease of discussion. The computing architecture and the distributed computing network include and utilize many more computing components, devices, software programs, networking devices, and other components not specifically described herein in embodiments.

While the subject matter described above has been presented in the general context of computing devices implementing virtualized environments, such as VMs and containers, those skilled in the art will recognize that other implementations are performed in combination with other types of computing devices, systems, and modules according to embodiments. Those skilled in the art will also appreciate that other computer system configurations, including hand-held devices, multiprocessor systems, microprocessor-based or programmable consumer electronics, computing or processing systems embedded in devices (such as wearable computing devices, automobiles, home automation, etc.), minicomputers, mainframe computers, and the like may be utilized to practice the subject matter disclosed herein in embodiments.

It is to be further understood that the operations of the routines and methods disclosed herein are not presented in any particular order and that performance of some or all of the operations in an alternative order, or orders, is possible and is contemplated. The operations have been presented in the demonstrated order for ease of description and illustration. Operations might be added, omitted, and/or performed simultaneously, without departing from the scope of the appended claims. The illustrated routines and methods might end at any time and need not be performed in their entireties in various embodiments.

Some or all operations of the methods, and/or substantially equivalent operations, are performed by execution of computer-readable instructions included on a computer-readable storage media, as defined herein, in embodiments. The term "computer-readable instructions," and variants thereof, as used herein, is used expansively herein to include routines, applications, application modules, program modules, programs, program components, data structures, algorithms, and the like. Computer-readable instructions are implemented on various system configurations, including single-processor or multiprocessor systems, minicomputers, mainframe computers, personal computers, hand-held computing devices, microprocessor-based, programmable consumer electronics, combinations thereof, and the like, according to embodiments.

The logical operations described herein are implemented (1) as a sequence of computer implemented acts or program modules running on a computing system and/or (2) as interconnected machine logic circuits or circuit modules within the computing system in embodiments. The implementation is a matter of choice dependent on the performance and other requirements of the computing system. Accordingly, the logical operations described herein are referred to variously as states, operations, structural devices, acts, or modules. In embodiments, these operations, structural devices, acts, and modules are implemented in software, in firmware, in special purpose digital logic, or any combination thereof.

For example, the operations illustrated in the sequence and flow diagrams and described herein are implemented in embodiments, at least in part, by modules implementing the features disclosed herein, for instance such as a dynamically linked library ("DLL"), a statically linked library, functionality produced by an API, a network service, a compiled program, an interpreted program, a script or any other executable set of instructions. Data is stored in a data structure in one or more memory components in an embodiment. Data is retrieved from the data structure by addressing links or references to the data structure in an embodiment.

The methods and routines described herein might be also implemented in many other ways. For example, in embodiments the routines and methods are implemented, at least in part, by a processor of another remote computer or a local circuit. In addition, one or more of the operations of the routines or methods might alternatively or additionally be implemented, at least in part, by a chipset working alone or in conjunction with other software modules.

The disclosure presented herein also encompasses the subject matter set forth in the following clauses:

Clause 1: A computer-implemented method, comprising: creating virtual network adapters in a virtualized environment, the virtual network adapters corresponding to network interfaces present on a host processing system providing the virtualized environment; aggregating the virtual network adapters behind a bond interface; exposing a virtual network interface to program components executing in the virtualized environment; bonding the virtual network interface to the bond interface; selecting one of the virtual network adapters as an active virtual network adapter in the bond interface; and routing network packets between the program components executing in the virtualized environment, the virtual network interface, the bond interface, the active virtual network adapter, and the network interface corresponding to the active virtual network adapter.

Clause 2: The computer-implemented method of clause 1, wherein the virtual network interface comprises a single virtual wireless interface and wherein the virtual network adapters comprise virtual Ethernet adapters.

Clause 3: The computer-implemented method of any of clauses 1 or 2, further comprising: intercepting a network control message generated by one of the program components executing in the virtualized environment; forwarding the network control message to the host processing system; and performing a command requested by the network control message at the host processing system.

Clause 4: The computer-implemented method of any of clauses 1-3, wherein the command comprises a request to scan for networks available to the host processing system.

Clause 5: The computer-implemented method of any of clauses 1-4, wherein the command modifies a network setting of the host processing system.

Clause 6: The computer-implemented method of any of clauses 1-5, wherein the command comprises a command to connect the host processing system to a specified network.

Clause 7: The computer-implemented method of any of clauses 1-6, wherein the command comprises a command to disconnect the host processing system from a specified network.

Clause 8: A computer-readable storage medium having computer-executable instructions stored thereupon that, when executed by a processing system, cause the processing system to: expose a virtual network interface to program components executing in a virtualized environment provided by the processing system; intercept a network control message generated by one of the program components executing in the virtualized environment; forward the network control message from the virtualized environment to the processing system; and perform a command requested by the network control message at the processing system.

Clause 9: The computer-readable storage medium of clause 8, having further computer-executable instructions stored thereupon to: create virtual network adapters in the virtualized environment, the virtual network adapters corresponding to network interfaces present on the processing system; select one of the virtual network adapters as an active virtual network adapter; and cause network packets to be routed between the program components executing in the virtualized environment, the virtual network interface, the active virtual network adapter, and the network interface corresponding to the active virtual network adapter.

Clause 10: The computer-readable storage medium of any of clauses 8 or 9, wherein the virtual network interface comprises a single virtual wireless interface and wherein the virtual network adapters comprise virtual Ethernet adapters.

Clause 11: The computer-readable storage medium of any of clauses 8-10, wherein the command comprises a request to scan for networks available to the processing system.

Clause 12: The computer-readable storage medium of any of clauses 8-11, wherein the command modifies a network setting of the processing system.

Clause 13: The computer-readable storage medium of any of clauses 8-12, wherein the command comprises a command to connect the processing system to a specified network.

Clause 14: The computer-readable storage medium of any of clauses 8-13, wherein the command comprises a command to disconnect the processing system from a specified network.

Clause 15: A processing system, comprising: a processor; and a computer-readable storage medium having computer-executable instructions stored thereupon that, when executed by the processing system, cause the processing system to: create virtual network adapters in a virtualized environment, the virtual network adapters corresponding to network interfaces present on the processing system; expose a virtual network interface to program components executing in the virtualized environment; select one of the virtual network adapters as an active virtual network adapter; and cause network packets to be routed between the program components executing in the virtualized environment, the virtual network interface, the active virtual network adapter, and the network interface corresponding to the active virtual network adapter.

Clause 16: The processing system of clause 15, wherein the virtual network interface comprises a single virtual wireless interface and wherein the virtual network adapters comprise virtual Ethernet adapters.

Clause 17: The processing system of any of clauses 15 or 16, wherein the computer-readable storage medium has further computer-executable instructions stored thereupon to: intercept a network control message generated by a program component executing in the virtualized environment; forward the network control message to the processing system; and perform a command requested by the network control message at the processing system.

Clause 18: The processing system of any of clauses 15-17, wherein the command comprises a request to scan for networks available to the processing system.

Clause 19: The processing system of any of clauses 15-18, wherein the command comprises a command to connect the processing system to a specified network.

Clause 20: The processing system of any of clauses 15-19, wherein the command comprises a command to disconnect the processing system from a specified network.

Technologies for providing compatible network resources to components executing in a virtualized environment have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes might be made to the subject matter described herein without following the example configurations and applications illustrated and described, and without departing from the scope of the present disclosure, which is set forth in the following claims.

What is claimed is:

1. A computer-implemented method, comprising:
creating virtual network adapters in a virtualized environment, the virtual network adapters corresponding to network interfaces present on a host processing system providing the virtualized environment;
aggregating the virtual network adapters behind a bond interface;
exposing a virtual network interface to program components executing in the virtualized environment;
bonding the virtual network interface to the bond interface;
selecting one of the virtual network adapters as an active virtual network adapter in the bond interface; and
routing network packets from the program components executing in the virtualized environment, to the virtual network interface, then to the bond interface, then to the active virtual network adapter, and then to the network interface corresponding to the active virtual network adapter.

2. The computer-implemented method of claim 1, wherein the virtual network interface comprises a single virtual wireless interface and wherein the virtual network adapters comprise virtual Ethernet adapters.

3. The computer-implemented method of claim 1, further comprising:
intercepting a network control message generated by one of the program components executing in the virtualized environment;
forwarding the network control message to the host processing system; and
performing a command requested by the network control message at the host processing system.

4. The computer-implemented method of claim 3, wherein the command comprises a request to scan for networks available to the host processing system.

5. The computer-implemented method of claim 3, wherein the command modifies a network setting of the host processing system.

6. The computer-implemented method of claim 5, wherein the network setting connects the host processing system to a specified network.

7. The computer-implemented method of claim 5, wherein the network setting disconnects the host processing system from a specified network.

8. A computer-readable storage medium having computer-executable instructions stored thereupon that, when executed by a processing system, cause the processing system to perform operations comprising:
creating virtual network adapters in a virtualized environment, the virtual network adapters corresponding to network interfaces present on a host processing system providing the virtualized environment;
aggregating the virtual network adapters behind a bond interface;
exposing a virtual network interface to program components executing in the virtualized environment;
bonding the virtual network interface to the bond interface;
selecting one of the virtual network adapters as an active virtual network adapter in the bond interface; and
routing network packets from the program components executing in the virtualized environment, to the virtual network interface, then to the bond interface, then to the active virtual network adapter, and then to the network interface corresponding to the active virtual network adapter.

9. The computer-readable storage medium of claim 8, wherein the virtual network interface comprises a single virtual wireless interface and wherein the virtual network adapters comprise virtual Ethernet adapters.

10. The computer-readable storage medium of claim 8, wherein the operations further comprise:
intercepting a network control message generated by one of the program components executing in the virtualized environment;
forwarding the network control message to the host processing system; and
performing a command requested by the network control message at the host processing system.

11. The computer-readable storage medium of claim 10, wherein the command comprises a request to scan for networks available to the host processing system.

12. The computer-readable storage medium of claim 10, wherein the command modifies a network setting of the host processing system.

13. The computer-readable storage medium of claim 12, wherein the network setting connects the host processing system to a specified network.

14. The computer-readable storage medium of claim 12, wherein the network setting disconnects the host processing system from a specified network.

15. A processing system, comprising:
a processor; and
a computer-readable storage medium having computer-executable instructions stored thereupon that, when executed by the processing system, cause the processing system to perform operations comprising:
creating virtual network adapters in a virtualized environment, the virtual network adapters corresponding to network interfaces present on a host processing system providing the virtualized environment;
aggregating the virtual network adapters behind a bond interface;
exposing a virtual network interface to program components executing in the virtualized environment;
bonding the virtual network interface to the bond interface;
selecting one of the virtual network adapters as an active virtual network adapter in the bond interface; and
routing network packets from the program components executing in the virtualized environment, to the virtual network interface, then to the bond interface, then to the active virtual network adapter, and then to the network interface corresponding to the active virtual network adapter.

16. The system of claim 15, wherein the virtual network interface comprises a single virtual wireless interface and wherein the virtual network adapters comprise virtual Ethernet adapters.

17. The system of claim 15, wherein the operations further comprise:
   intercepting a network control message generated by one of the program components executing in the virtualized environment;
   forwarding the network control message to the host processing system; and
   performing a command requested by the network control message at the host processing system.

18. The system of claim 17, wherein the command comprises a request to scan for networks available to the host processing system.

19. The system of claim 17, wherein the command modifies a network setting of the host processing system.

20. The computer-readable storage medium of claim 19, wherein the network setting connects the host processing system to a specified network or disconnects the host processing system from another specified network.

* * * * *